United States Patent [19]
Johnson et al.

[11] 3,743,398
[45] July 3, 1973

[54] MOTION PICTURE PROJECTOR
[75] Inventors: Robert B. Johnson; Fred N. Woodhouse, both of Rochester, N.Y.
[73] Assignee: Eastman Kodak Company, Rochester, N.Y.
[22] Filed: Mar. 22, 1971
[21] Appl. No.: 126,733

[52] U.S. Cl.................. 352/157, 352/124, 352/173
[51] Int. Cl. ............................................. G03b 1/56
[58] Field of Search.................... 352/124, 159, 157, 352/158, 173

[56] References Cited
UNITED STATES PATENTS
1,944,024   1/1934   Foster............................... 352/124
3,134,294   5/1964   Kaden............................... 352/159

*Primary Examiner*—Samuel S. Matthews
*Assistant Examiner*—Monroe H. Hayes
*Attorney*—W. H. J. Kline and Milton S. Sales

[57] ABSTRACT

A motion picture projector having film threading, forward projection, reverse projection, still projection and rewind modes includes a projection gate and an intermittently operated film feeding member adjacent the projection gate for advancing film through the gate along a film threading path in forward and reverse directions. A rotary drive sprocket wheel for the sound system of the projector is located along the film path for moving the film away from the projection gate when the projector is in its forward projection mode. The film is prevented from engaging the sprocket wheel when the projector is in any but its forward projection mode. A loop former between the projection gate and the sprocket wheel provides a free loop of film between the gate and the wheel during forward projection while functioning as a film snubber during reverse projection.

9 Claims, 9 Drawing Figures

FIG. 1

ROBERT B. JOHNSON
FRED N. WOODHOUSE
INVENTORS

BY *Milton S. Saks*

*W.H.J. Kline*

ATTORNEYS

ROBERT B. JOHNSON
FRED N. WOODHOUSE
INVENTORS

ROBERT B. JOHNSON
FRED N. WOODHOUSE
INVENTORS

BY Milton I. Sales

W. H. J. Kline
ATTORNEYS

ROBERT B. JOHNSON
FRED N. WOODHOUSE
INVENTORS

BY *Milton J. Sales*

*W. H. J. Kline*
ATTORNEYS

ROBERT B. JOHNSON
FRED N. WOODHOUSE
INVENTORS

BY *Milton S. Sales*

*W. H. J. Kline*
ATTORNEYS

MOTION PICTURE PROJECTOR

BACKGROUND OF THE INVENTION

1. Field of the Invention

The present invention relates to motion picture projectors, and more particularly to the apparatus in such projectors which guides the film through a predetermined path.

2. Description of the Prior Art

Devices for facilitating the threading of film through a motion picture projector are known in the art. For example, in U.S. Pat. No. 2,051,785 to Foster there is disclosed a motion picture projector having a mechanism for opening a film threading path to provide for edgewise insertion of the film. To prevent interference with the film by the drive sprocket wheels, pivotable shields are moved during the threading process to separate the threading path from the sprocket wheels.

In other projectors, for example those shown in U.S. Pat. No. 3,134,294 to Kaden et al. and British Patent No. 615,998, to thread the projector it is required only that the film be placed in engagement with a supply sprocket wheel which will then operate in a fully automatic manner not only to thread the film and provide proper loops therein, but also to automatically start the operation of the apparatus after the film has been threaded properly through the projector. In such projectors, the leading end of the film is picked up by each successive sprocket wheel as it advances along the threading path. For reverse projection, it is necessary to reverse the direction of rotation of the sprocket wheels in order to advance the film from the take-up reel to the supply reel.

SUMMARY OF THE INVENTION

It is an object of the present invention to provide a motion picture projector in which the film is threaded along a threading path which does not include a sprocket wheel, and wherein the film may be moved into contact with a sprocket wheel after it has been properly threaded and while it is being projected at the normal speed.

It is another object of the present invention to provide a motion picture projector with mechanism enabling it to operate as a sprocket projector in its forward projection mode and to operate as a sprocketless projector in its reverse projection mode.

In accordance with these and other objects and with one feature of the present invention, a motion picture projector having film threading and forward projection modes, a projection gate and means for advancing the leading end of a filmstrip introduced into the projection gate along a film threading path when the projector is in its film threading mode includes a rotary drive sprocket wheel located along the film path subsequent to the projection gate for moving the film along a path in a direction from the gate toward the sprocket wheel when the projector is in its foward projection mode. Sensing means are provided for detecting the presence of film along the threading path subsequent to the sprocket wheel, and a film guide member is movable in response to such film detection from a first position preventing film in the film threading path from contacting the sprocket wheel to a second position permitting the film in the film path to be engaged by the sprocket wheel.

In accordance with another feature of the present invention, a motion picture projector of the above-described type is provided with a loop former adapted to engage one surface of the reach of film extending between the projection gate and the sprocket wheel and mounted for movement transversely of the reach of film from a first position wherein the loop former forms a predetermined size loop of film between the gate and the sprocket wheel to a second position spaced from the film path whereby the film may take a shorter path between the projection gate and the sprocket wheel. The loop former is held in its first position when the projector is in its threading mode. A film guide member is movable between a first position to prevent film from contacting the sprocket wheel and a second position to permit the film to be engaged by the sprocket wheel in response to the direction of film along the threading path subsequent to the sprocket wheel. The loop former is moved from its first to its second position as the guide member is moved from its first to its second position, whereby the reach of film extending between the projection gate and the sprocket wheel will be shortened as the film closes upon the sprocket wheel to thereby effect relative motion between the film and the sprocket wheel. This insures proper alignment of the sprockets and the film perforations.

In accordance with yet another feature of the present invention, a motion picture projector having a film threading path, a projection gate, and an intermittently operated film feeding member adjacent the projection gate for advancing film through the gate in forward and reverse direction includes a rotary drive sprocket wheel located along the film threading path. Means are provided for preventing the film from contacting the sprocket wheel when the film is being intermittently advanced through the gate in a reverse direction. A movable snubber member is adapted to engage at least one surface of the reach of film extending between the projection gate and the sprocket wheel and is mounted for movement transversely of the reach of film it engages from a first position, forming a loop of film between the gate and sprocket wheel equal to at least one frame length of the film when the film feeding member is not advancing film, to a second position in response to operation of the intermittent film feeding member to advance film through the gate in a reverse direction by one frame, and to a third position out of engagement with the film. A spring normally urges the snubber member to its first position, and means are provided for moving the snubber member to its third position when the film is being intermittently advanced through the gate in a foward direction, whereby the projector operates as a sprocket projector in its forward mode and as a sprocketless projector in its reverse mode.

The invention and its objects and advantages will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Because motion picture projectors are well known, the present description will be directed in particular to elements forming part of, or cooperating more directly with, apparatus in accordance with the present invention. It is to be understood that projector elements not specifically shown or described may take various forms well known to those skilled in the art.

The projector partially shown in the drawings is adapted to feed film through a horizontal film path and to erect the projected image by means of a series of mirrors. However, the present invention is equally applicable in more conventional projectors having vertical film paths. The illustrated projector includes a horizontal plate 10 upon which a conventional projection gate 12 is mounted. Light from a lamp 14 passes through an aperture 16 in gate 12 and an objective 18 and is reflected to a screen, not shown, by a first mirror 19 and a second mirror, not shown, that is disposed above the first mirror. Film is fed from a supply roll, not shown, past a conventional film snubber 22, through a film threading channel or path defined in part by a pair of film guides 24 and 26 and into projection gate 12 where it is advanced by a conventional pull down system which includes an intermittently operated film advancing member or pull down claw member 21 extending through an elongate opening 20 in gate 12.

In motion picture projectors which provide for automatically rewinding of film from a take-up reel onto the supply reel after the film has been projected, it is conventional to actuate the rewind mechanism in response to the detection of an increase in film tension by the film snubber mechanism. Such a device is shown in coassigned U.S. Pat. No. 3,300,155 in the name of R. J. Roman. In the illustrated embodiment of the present invention, the rewind mechanism for disengaging the film from the pull down claw, withdrawing the pressure pad of film gate 12 from the film and disconnecting the drive mechanism from the take-up reel and connecting it to the supply reel is electrically actuated by closure of a switch 28 in response to movement of film snubber 22 by increased film tension. For clarity, details of the rewind mechanism have not been shown since suitable rewind effecting mechanism is shown in the aforementioned Roman Patent and and in U.S. Pat. No. 3,468,498 in the name of L. J. Bunting.

The film threading channel from film gate 12 to the take-up reel, not shown, is defined in part by a series 32–39 of stationary guide members that jointly define a generally U-shaped film path. A loop former 40 is pivotally mounted at 41 to a support plate 42 and spring-urged toward guide 33. Loop former 40 carries a dpending stud 43 which projects through an arcuate slot 44 in a support plate 42 mounted on plate 10. Stud 43 is aligned with a bent tab 45 on a lever 46 pivotally mounted on plate 10.

A sound recording and/or reproducing head 48 is carried by plate 42 between loop former 40 and guide member 34, guide member 34 being curved about a capstan 54 rotatably mounted on plate 42. A sound lever 60 is rotatably carried on plate 10 by a pivot pin 62. The sound lever is urged in a clockwise direction as viewed in the drawings by a torsion spring 64 which abuts a pair of pins 66 and 68 on one end of lever 60 and on plate 10, respectively. The opposite end of sound lever 60 includes a leg 76 from which cam follower stud 70 depends through a linear slot 72 in plate 10. A series of gear teeth make up a rack 74 on one edge of leg 76 of the sound lever. The teeth on the outermost end of rack 74, i.e., the end nearest stud 70, are narrowed for reasons to be set forth hereinafter.

A U-shaped bracket 78 projects upwardly from sound lever 60 to straddle a stud 80 mounted on a sound head pressure pad 82. A pair of coil springs 84 and 86 are carried on stud 80 on either side of bracket 78 so that movement of sound lever 60 causes pressure pad 82 to be moved toward and away from sound head 48. A pin 87 on lever 46 projects through a slot 88 in sound lever 60 to move lever 46 upon movement of the sound lever.

A bracket 90 is pivotally mounted on a pair of ears 92 and 94 (FIG. 1) of film guide 36 by a pin 96 and carries a bent leaf spring 98 which is held in its bent configuration by a nut 100 on a threaded stud 102, the nut and the head of the stud bearing against opposite portions of the spring. A stud 103 on film guide 35 passes through a hole in bracket 90, the bracket being urged in a clockwise direction about pin 96 by a coil spring 104. The bracket carries a stabilizer roller 106 which is moved toward capstan 54 by a tab 108 mounted on sound lever 60 when the sound lever is rotated in a clockwise direction about pin 62 to move tab 108 against spring 98, thereby biasing bracket 90 and roller 106 toward the capstan against the biasing force of spring 104.

A pair of levers 110 and 112 (FIG. 2) are rotatably carried on film guide 36 by a pin 114. Lever 110 is biased in a counterclockwise direction about pin 114 by a coil spring 116 connected between that lever and ear 92. Lower lever 112 is movable about pin 114 in the same plane as a leaf spring 118 mounted on sound lever 60 so that lever 112 is urged in a clockwise direction by spring 118 as the sound lever is moved clockwise against the force of spring 64. A movable film guide shoe 120 is rotatably connected to the free ends of both levers 110 and 112 by a pin 122 that interconnects the levers.

Figure 6:
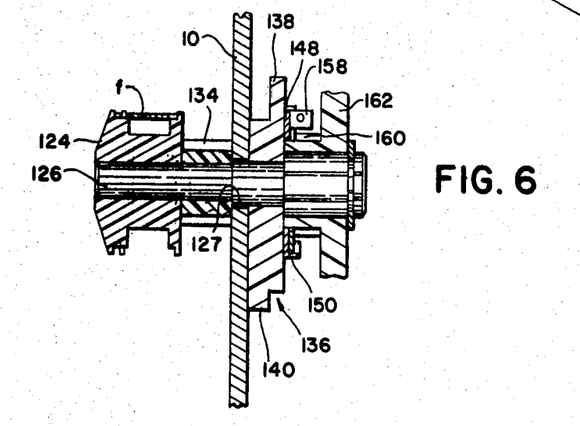
FIG. 6 is a sectional view taken along line 6—6 of FIG. 5B and showing the sprocket wheel, drive shaft, a portion of the clutch operating member and other features of the projector apparatus shown in FIG. 1.

Film guide shoe 120 is shaped to fit about a portion of a drive sprocket wheel 124 mounted on a shaft 126 which extends through an opening 127 (FIGS. 1 and 6) in plate 10. Rotatably carried by shaft 126 above plate 10 is a movable film guide member 128 having an attached film guide plate 130 that defines a wall portion of the film path, a rotatable roller 132 over which the film may be trained before it reaches plate 130, and a pinion 134 coaxial with shaft 126 in meshing engagement with rack 74 of sound lever so that movement of the sound lever about pin 62 rotates the entire guide member about shaft 126. Roller 132 is positioned so that film tensioned in the film path pulls against the roller to tend to rotate guide member 128 in a clockwise direction about shaft 126. Because the teeth of rack 74 nearest stud 70 are narrowed, there is a small amount of backlash between rack 74 and pinion 134 in this area of the rack.

Shaft 126 extends freely through plate 10 and carries a cam member 136 located below plate 10. The cam member comprises a cylindrical hub 138 concentric with the bore of the cam member and a profiled cam surface 140 arranged to be followed by stud 70 of sound lever 60. Torsion spring 64 keeps stud 70 in contact with the cam surface. A clutch assembly 142 is mounted on a stud 146 on cam member 136. Clutch assembly 142 includes a spring plate 148 having a protruding leaf spring 150 and a dog member 152. Spring plate 148 and dog member 152 are retained on stud 146 by a snap ring 154. A spring 156 is connected to stud 144 and an ear 158 of the dog member. The dog member 152 is biased by spring 156 to urge dog ear 158 toward engagement with the multiple toothed peripheral surface of a hub member 160 of a sprocket drive gear 162. Gear 162 is mounted on shaft 126, and is constantly driven during operation of the projector by suitable drive means not shown in the drawings. Thus, when the dog ear is received between two of the teeth of the constantly rotating hub member 160, the cam member is coupled positively to shaft 126 for rotation therewith.

In order to engage and disengage clutch assembly 142, a pair of clutch operating levers 164 and 166 are pivoted to support plate 10 on a pin 168 about which the levers are rotatably urged in a clockwise direction by springs 170 and 172, respectively, to bias ears 174 and 176 on the levers away from clutch assembly 142. A slidable cam plate 178 is mounted by a pin-and-slot arrangement on pin 168 and a pin 180 carried by plate 10. Plate 178 is connected to the armature 182 of an electromechanical device or solenoid 184 and is biased leftwardly by a spring 186. As best illustrated in FIGS. 4B and 5B, a cam surface 188 on plate 178 has two spaced recessed portions along its upper edge that are positioned with respect to pins 190 and 192 on clutch operating levers 164 and 166 so that the cam surface portions selectively and alternately move levers 164 and 166 to bring lever ears 174 and 176 into positions where the lever ears are in the path of spring 150 and a tab 194 on dog member assembly 142, thereby holding dog ear 158 out of engagement with hub member 160 and allowing the clutch assembly 142 and cam 136 to remain at a stationary position as shaft 126 rotates.

When plate 178 is shifted from one of its positions to the other position, the ear 174 or 176 in contact with spring 150 and tab 194 moves beyond the spring and tab, and the other ear 174 or 176 moves into the path of the spring and tab. Accordingly, the dog member immediately pivots about stud 146 under the influence of spring 156 to engage ear 158 with the teeth on hub member 160, thereby coupling the clutch assembly 142 and cam member 136 to shaft 126. As soon as the cam has rotated through a defined angle, however, rotation of clutch assembly 142 brings spring 150 into contact with the ear 174 or 176 which has now moved into its path. This pivots clutch member 152 about stud 146, and the cam member 136 is again immobilized by disengagement of the dog ear from the hub member. Energization of solenoid 184 is controlled by the closure of any one of a plurality of switches, to be set forth in detail hereinafter, which control the opening of the film threading path.

The film threading path is partially defined about sprocket wheel 124 by guide member 37 which includes a movable portion 202 pivoted at 204. Movable portion 202 is rotatably urged in a clockwise direction about pivot 204 by a spring 206 and is moved to the position illustrated in FIG. 4A when sound lever 60 is moved against the force of spring 64 by interference between leg 76 of sound lever 60 and a tab 208 on guide member portion 202. By moving to its position shown in FIG. 4A, portion 202 of guide member 37 narrows the film threading path to prevent buckling of film should the film be instantaneously fed by sprocket wheel 124 faster than it is wound onto the take-up reel.

Figure 1:
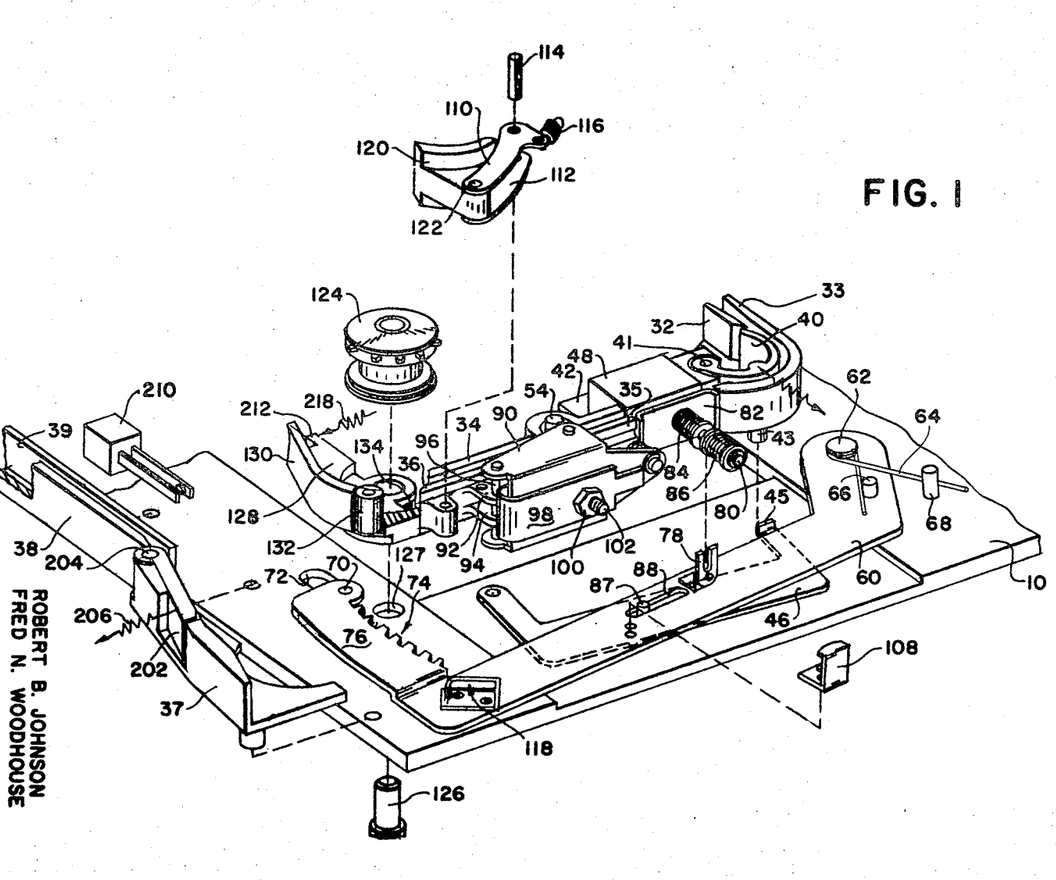
FIG. 1 is an exploded view in perspective of a portion of a motion picture projector in accordance with the present invention.
Figure 2:
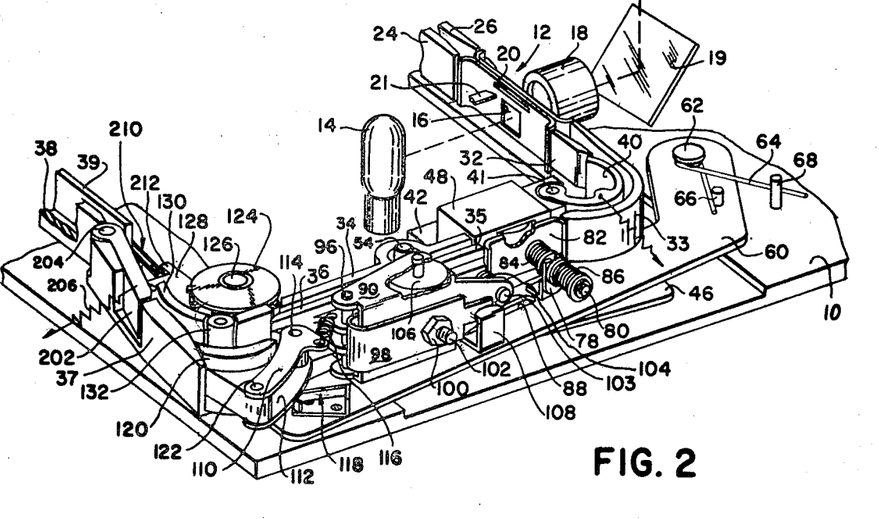
FIG. 2 is a view in perspective of a portion of the projector shown in FIG. 1 with the film threading path open.
Figure 3:
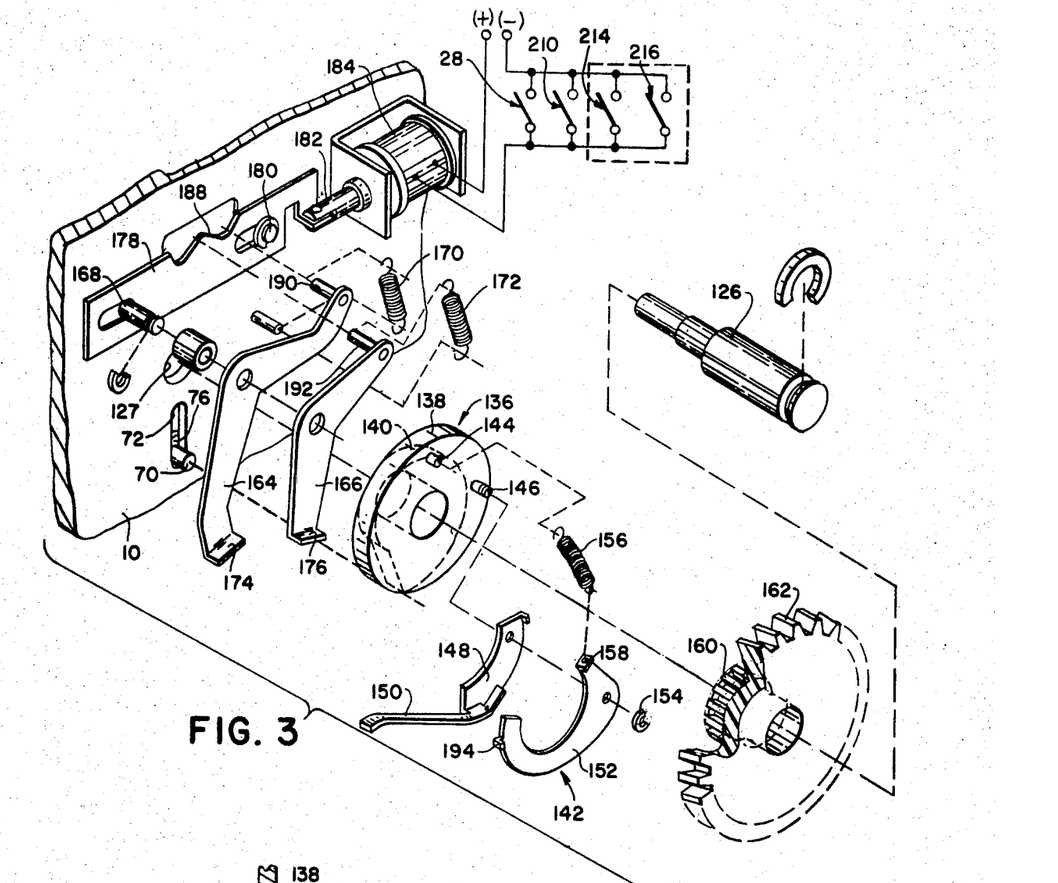
FIG. 3 is an enlarged, exploded view of a portion of a clutch mechanism for the projector shown in FIG. 1.
Figure 5A:
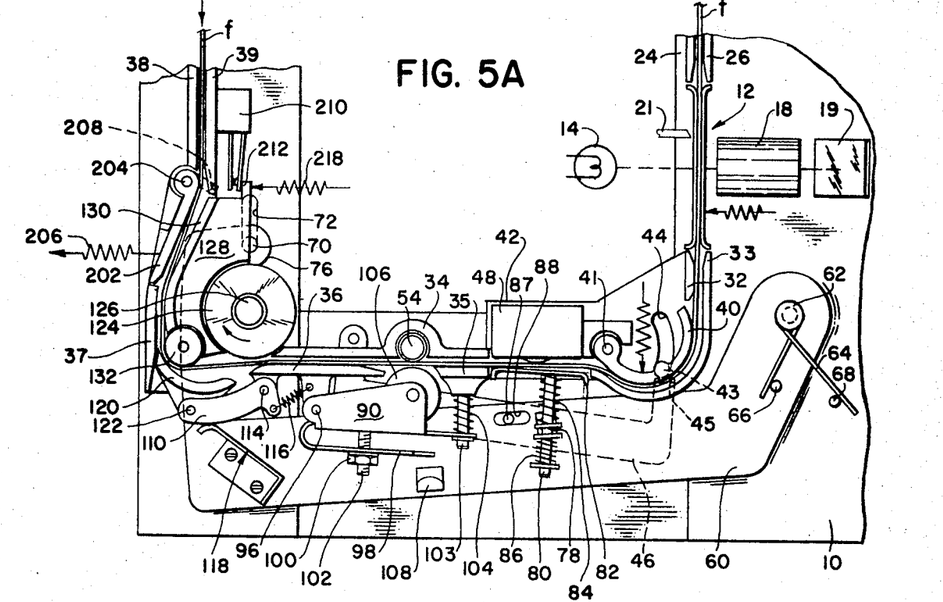
FIG. 5A is a top view of a portion of the projector shown in FIG. 1 wherein the film threading path is open.
Figure 5B:
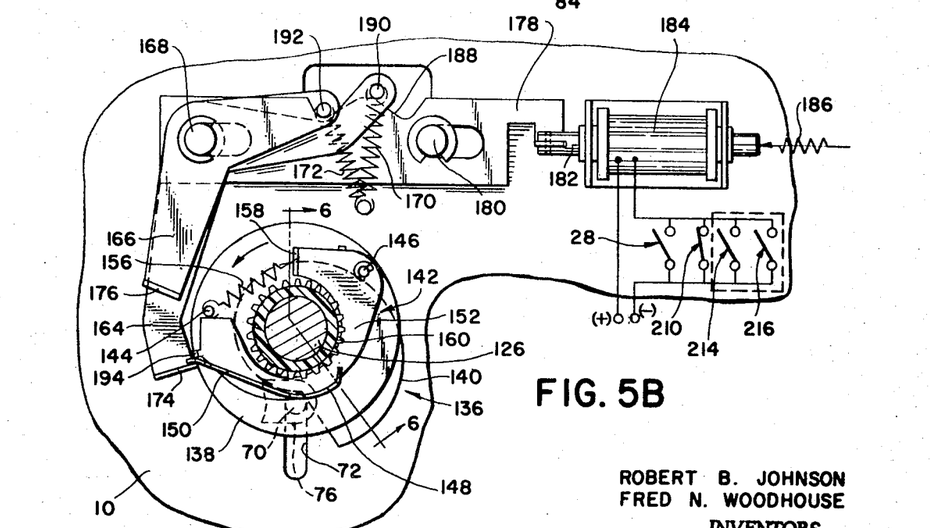
FIG. 5B is a bottom view of the clutch mechanism shown in FIG. 3 in its configuration when the film threading path is open.

In order to detect the presence of film in the threading path between sprocket wheel 124 and the take-up reel, a normally open switch 210 is mounted on plate 10 in a position such that a tab 212 on movable guide member 128 closes the switch when the guide member is in the position shown in FIGS. 1, 2 and 5A. Movement of the guide member in a clockwise direction about shaft 126 causes the opening of switch 210. As shown in FIG. 3, switch 210, switch 28 controlled by snubber 22, a switch 214 which is closable in response to manually placing the projector in any of its still project, reverse project or rewind modes and a switch 216 which is closable upon placing the projector in its film threading mode and connected in parallel across solenoid 184 so that upon closure of any one of these switches, the solenoid is energized to pull plate 178 to the right to its FIG. 5B position; thereby withdrawing ear 176 from contact with leaf spring 150 and mvoing ear 174 into the path of the leaf spring.

FILM THREADING MODE

When a supply roll of film has been placed on the projector or when it is desired to replay the supply roll presently on the projector, the operator depresses a button or moves a lever to place the apparatus in a "film threading" mode. The operator's action is accompanied by closure of switch 216 to energize solenoid 184. Regardless of the condition of the projector mechanism prior to closure of switch 216 (the film threading path may be open or closed), energization of solenoid 184 pulls armature 182 and plate 178 to the right as viewed in FIG. 5B. Cooperation between cam surface 188 on the plate and pins 190 and 192 rocks clutch operating levers 164 and 166 about pin 168 to withdraw ear 176 from the path of tab 194 and to place ear 174 in the path of the tab. If at that time tab 194 is not in contact with ear 174 (i.e., if the film threading path is closed), dog member 152 will be rocked about stud 146 by spring 156 until dog ear 158 engages the teeth on hub member 160 of constantly rotating gear 162.

Engagement of dog ear 158 and hub member 160 causes cam member 136 to rotate with gear 162 and shaft 126 until spring 150 and tab 194 engage ear 174, thereby withdrawing dog ear 158 from hub member 160. At that time, the mechanism will be arranged as illustrated in FIG. 5B where cam follower stud 70 is at the low point of cam surface 140.

Referring to FIGS. 1, 2 and 5A, it will be seen that movement of stud 70 to the low point of cam surface 140 permits spring 64 to move sound lever 60 to its position shown in those figures. Pin 87 carried within slot 88 moves lever 46 away from stud 43 of loop former 40, thereby allowing the loop former to move towards film guide 33 under spring bias where it will engage the reach of film extending between gate 12 and sprocket wheel 124 to form a predetermined size loop of film. Movement of clamp 78 away from sound head 48 pulls pressure pad 82 therewith to open a threading path between the pressure pad and the sound head. In like manner, roller 106 is withdrawn from contact with capstan 54 and film guide shoe 120 is rotated away from sprocket wheel 124. Movement of rack 74 on leg 76 of sound lever 60 rotates pinion 134 and movable film guide member 128 about shaft 126 until the guide member is between the film threading path and the sprocket wheel. Tab 212 on guide member 128 will now close switch 210. At this time, film threading switch 216 may be opened and solenoid 184 will remain energized by current passing through switch 210.

Film F introduced into film gate 12 will be advanced by projector pull-down claw 21 through the film threading path to the film take-up mechanism which includes a conventional tendency drive mechanism which tensions the film. As the film's tension increases, pressure is applied against roller 132 to rotate guide member 128 slightly about shaft 126 against the force of a light spring 218. This rotation is possible due to the backlash between pinion 134 and the teeth at the end of rack 74 opposite from stud 70.

Figure 4B:
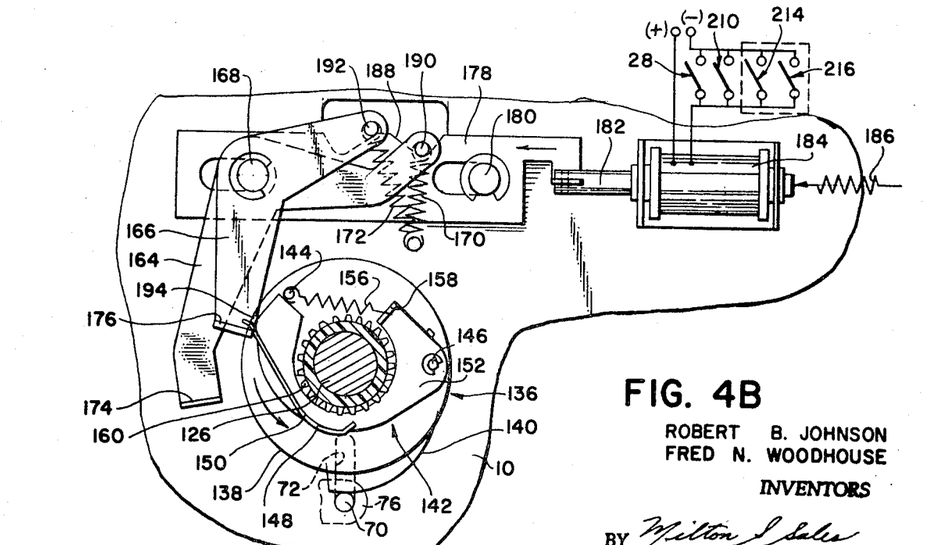
FIG. 4B is a bottom view of the clutch mechanism shown in FIG. 3 in its configuration when the film threading path is closed.
Figure 5C:
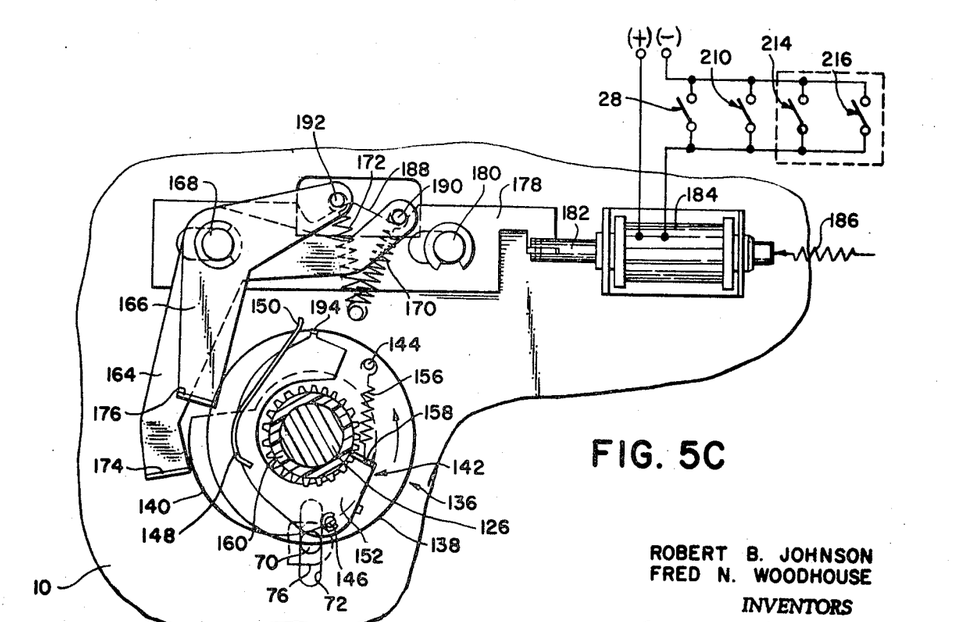
FIG. 5C is a bottom view of the clutch mechanism shown in FIG. 3 in its configuration when the film threading path is closing.

This slight rotation of member 128 opens switch 210 and deenergizes solenoid 184. Armature 182 and plate 178 are moved to the left as shown in FIG. 5C by spring 186. Cam surface 188 on plate 178 rocks clutch operating levers 164 and 166 to withdraw ear 174 from tab 194 and to place ear 176 in the path of tab 194 as shown in FIGS. 4B and 5C. As soon as ear 174 is withdrawn from tab 194, spring 156 pulls dog ear 158 into engagement with the teeth on hub member 160 to interconnect cam member 136 and rotating shaft 126. As cam member 136 rotates with the shaft, stud 70 follows cam surface 140 to slowly rotate sound lever 60 about pin 62 against the force of spring 64. FIG. 5C shows a view of cam member 136 during this process and FIG. 4B shows the cam member after tab 194, cushioned by spring 150, has engaged ear 176 of clutch operating lever 166 to pull dog ear 158 out of engagement with the teeth on hub member 160 to stop rotation of clutch member 136.

Figure 4A:
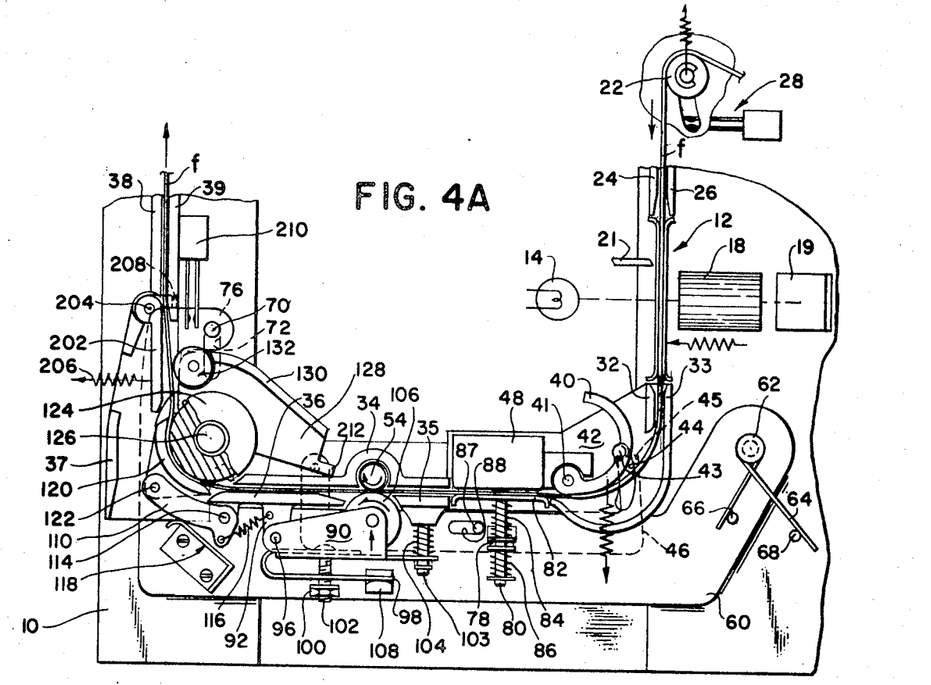
FIG. 4A is a top view of a portion of the projector shown in FIG. 1 with the film threading path closed.

Referring now to FIG. 4A, it is seen that clockwise rotation of sound lever 60 about pin 62 slowly closes pressure pad 82 upon the film adjacent sound head 48, pushes roller 106 against the film adjacent capstan 54 and brings film guide shoe 120 into contact with the film trained about sprocket wheel 124. During movement of sound lever 60, rack 74 rotates pinion 134 to revolve movable film guide member 128 about shaft 126, thereby allowing film F to be drawn slowly into engagement with sprocket wheel 124 by operation of the film take-up mechanism. During movement of the film towards sprocket wheel 124, pin 87 in slot 88 of the sound lever moves lever 46 and its tab 45 against stud 43 of loop former 40. Since the film path between gate 12 and sprocket wheel 124 is shortened as loop former 40 pivots about shaft 41, the film will advance past sprocket wheel 124 faster than the sprockets are moving so that the film perforations are sure to align with the sprockets. In this regard, it should be noted that the inertia of the film take-up system and the tension it exerts on the film should be such as to maintain engagement between the film and the sprocket during this operation. At the time of engagement of the film perforations and the sprocket teeth, loop former 40 has moved only part way along slot 44 so that a free loop is formed in the film between the loop former and film guide 33 as the loop former continues to move to the end of its travel (FIG. 4A). This loop accommodates instantaneous differences in film speed through the gate and about sprocket wheel 124.

Upon approaching the end of its travel, sound lever leg 76 contacts tab 208 of guide member portion 202 to rotate the guide member portion about pivot 204, thereby closing the film threading path to prevent film buckling should the rate at which film is taken up by the take-up reel instantaneously fall below that at which it is supplied by sprocket wheel 124. Upon completion of movement of sound lever 60, the projector apparatus is positioned as shown in FIGS. 4A and 4B and the projector continues to operate in a forward project mode.

STILL, REVERSE AND MANUAL REWIND MODES

In projectors which include one or more of the capabilities of still projection, reverse projection and manually actuated rewind through the projection gate, these functions are normally initiated by movement of levers and/or buttons accessible to the operator. In accordance with features of the present invention, switch 214 is arranged to be closed when the projector is placed in any of these operational modes. If the projector is in its forward project mode when switch 214 is closed, solenoid 184 will be energized to withdraw ear 176 of clutch operating lever 166 from tab 194 and to position ear 174 of clutch operating lever 164 in the path of the tab. As soon as tab 194 has been released by ear 176, dog ear 158 engages hub 160 to interconnect shaft 126 and cam member 136. Rotation of the cam member allows cam follower stud 70 to quickly return to the lowest portion of cam surface 140, thereby rotating sound lever 60 to the position shown in FIGS. 1, 2 and 5A; thereby opening the film threading path as described hereinbefore.

Since sprocket wheel 124 continues to rotate in a forward direction, it is important that film F be quickly removed therefrom to prevent damage to the film perforations due to relative motion between the film and the sprocket. Therefore, cam surface 140 has been configured to permit full opening of the film threading path during only about 30° of rotation of shaft 126 from the position shown in FIG. 4B, the closing of the film threading path taking substantially longer to permit the formation of a loop by loop former 40, and alignment of the sprockets on wheel 124 with the film perforations.

With the film threading path open below gate 12, the mechanism will operate as a sprocketless projector in its reverse projection mode. During such operation, loop former 40 will be released by tab 45 of lever 46 and will be spring urged toward film guide 33 to function as a film snubber. That is, loop former 40 will be movable transversely of the reach of film it engages from a first position, wherein it forms a loop of film between gate 12 and sprocket wheel 124 equal to at least one frame length of the film when pull-down claw 21 is not advancing film to a second position to which it is moved by the film in response to operation of the claw to advance film through the gate in a reverse direction.

AUTOMATIC REWIND MODE

Many commercially available projectors include the capability of automatically rewinding film onto the supply reel after the entire roll has been projected. In some such projectors, the trailing end of the film is attached to the supply reel hub in any conventional manner such as for instance as described in above-mentioned U.S. Pat. No. 3,468,498. After the film has been projected, increased film tension in the length of film between the supply reel and the pull-down mechanism at the film gate caused by continued operation of the film pull-down claw at the end of forward projection depresses a film snubber to release a latch, thereby setting the projector mechanism in a rewind mode.

In the illustrated embodiment of the present invention, movement of film snubber 22 in response to increased film tension closes switch 28 to actuate the film rewind cycle by conventional mechanism, not shown, disengaging claw 21 from the film, withdrawing the pressure pad of gate 12 and disconnecting the drive system from the take-up reel and connecting it to the supply reel. Closure of switch 28 also energizes solenoid 184 resulting in the opening of the film threading path as described hereinbefore.

SILENT PROJECTION MODE

In the partially illustrated projector, the film threading path will be closed during forward projection, either silent or sound. In some applications, it may be desirable to operate the mechanism as a sprocketless silent projector with the film out of contact with sound head 48, capstan 54 and sprocket wheel 124. This may be accomplished by adding a fifth switch, not shown, across solenoid 184 to be closed during silent projection. As in the case of switches 28, 210, 214 and 216, closure of such a fifth switch would energize solenoid 184 to open the film threading path below gate 12. As in the case of reverse projection, loop former 40 would function as a film snubber.

The invention has been described in detail with particular reference to a preferred embodiment thereof, but it will be understood that variations and modifications can be effected within the spirit and scope of the invention.

We claim:

1. In a motion picture projector having film threading and forward projection modes, means defining a film path, a projection gate located along the film path, and means for advancing the leading end of a filmstrip introduced into the projection gate along the film threading path when the projector is in its film threading mode, a rotary drive sprocket wheel located along the film path subsequent to the projection gate for moving the film along the film path in a direction from the projection gate to said drive sprocket wheel when the projector is in its forward projection mode and a film guide member movable between a first position between the film threading path and said sprocket wheel to prevent film in the film threading path from contacting said sprocket wheel and a second position remote from the film path to permit the film in the film path to be engaged by said sprocket sheet, the improvement comprising:

means for holding said film guide member in its first position, said holding means comprising (1) first and second members coupled together to permit at least limited movement of said guide member toward and away from its second position when it is in its first position, and (2) a spring coupled to said guide member and urging said member away from its second position and toward its first position;

sensing means for detecting the presence of film along the film path subsequent to said drive sprocket wheel, said sensing means including an electrical switch and means for actuating said switch in response to movement of said film guide member against the spring force; and means responsive to the detection of film by said sensing means for moving said film guide member from its first toward its second position.

2. A motion picture projector as defined in claim 1 wherein said means for holding said film guide member in its first position includes an electromechanical device selectively energizable through said switch.

3. A motion picture projector having a film threading path, a projection gate, and an intermittently operated film feeding member adjacent the projection gate for advancing film through the gate in forward and reverse directions, said projector comprising:

a rotary drive sprocket wheel located along the film threading path subsequent to the projection gate for moving the film along the film path in a direction from the projection gate to said sprocket wheel when film is being intermittently advanced through the gate in a forward direction;

means for preventing the film from contacting said sprocket wheel when the film is being intermittently advanced through the gate in a reverse direction;

a movable snubber member adapted to engage at least one surface of the reach of film extending between the projection gate and said sprocket wheel, said snubber member being mounted for movement transversely of the reach of film it engages from a first position, wherein said snubber forms a loop of film between the gate and said sprocket wheel equal to at least one frame length of the film when the film feeding member is not advancing film to (1) a second position, to which it is moved by the reach of film it engages in response to operation of the intermittent film feeding member to advance film through the gate in a reverse direction by one frame and to correspondingly foreshorten said film loop and (2) a third position out of engagement with the film;

a spring normally urging said snubber member to said first position, said spring being sufficiently stiff so that said snubber normally oscillates at a normal frequency corresponding to the frequency of the intermittent film feeding member, over a path of a length corresponding to the advancement of one frame length of the film; and means for moving said snubber member to its third position when the film is being intermittently advanced through the gate in a forward direction.

4. A motion picture projector having film threading and forward projection modes, a projection gate, and means for advancing the leading end of a filmstrip introduced into the projection gate along a film threading path when the projector is in its film threading mode, said projector comprising:

a rotatable shaft mounted adjacent said film path subsequent to the projection gate;

drive means for rotating said shaft;

a sprocket wheel mounted on said shaft for rotation therewith said wheel being positioned with respect to the film path for moving the film along the film path in a direction from the projection gate to said sprocket wheel when the projector is in its forward projection mode;

sensing means for detecting the presence of film along the threading path subsequent to said sprocket wheel;

a film guide member rotatably mounted on said shaft and movable between a first position between the film threading path and said sprocket wheel to prevent film in the film threading path from contacting said sprocket wheel and a second position remote from the film path to permit the film in the film path to be engaged by said sprocket wheel;

a pair of engageable clutch parts;

means interconnecting one of said clutch parts and said shaft;

means interconnecting the other of said clutch parts and said guide member for moving said guide member between its first and second positions upon engagement of said clutch parts; and means responsive to the detection of film by said sensing means for engaging said clutch to move said guide member to its second position.

5. A motion picture projector as defined in claim 4 wherein said means interconnecting said other clutch part and said guide member comprises:

a rotatable cam member coupled to said other clutch part;

a movable lever;

a cam follower on said lever adjacent said cam member;

a spring biasing said cam follower into engagement with said cam member; and means interconnecting said lever and said guide member for simultaneous movement.

6. A motion picture projector as defined in claim 5 wherein said interconnecting means comprises:

a pinion coupled to said guide member concentric with said shaft; and a rack on said lever in meshing engagement with said pinion.

7. A motion picture projector as defined in claim 6 wherein:

said pinion is movable at least a slight distance relative to said rack at least when said guide member is in its first position; and said sensing means includes (1) means for moving said guide member and said pinion relative to said lever and said rack in response to the presence of film along the threading path subsequent to said sprocket wheel, and (2) means for detecting such movement of said guide member.

8. A motion picture projector as defined in claim 7 wherein said means for engaging said clutch parts comprises an electromechanical device actuatable in response to the detection of movement of said guide member by said sensing means.

9. A motion picture projector having film threading and forward projection modes, a projection gate, and means for advancing the leading end of a perforated filmstrip introduced into the projection gate along a film threading path when the projector is in its film threading mode, said projector comprising:

a rotary drive sprocket wheel located along the film path subsequent to the projection gate for moving the film along the film path in a direction from the projection gate to said sprocket wheel when the projector is in its forward projection mode;

a movable loop former adapted to engage one surface of the reach of film extending between the projection gate and said sprocket wheel, said loop former being mounted for movement transversely of the reach of film it engages from (1) a first position, wherein said loop former forms a predetermined size loop of film between the gate and said sprocket wheel, to (2) a second position spaced from the film path, whereby the film may take a shorter path between the projection gate and said sprocket wheel;

means for holding said loop former in its first position when the projector is in its threading mode;

a film guide member movable between a first position between the film threading path and said sprocket wheel to prevent film from contacting said sprocket wheel and a second position remote from the film path to permit the film to be engaged by said sprocket wheel;

means for holding said film guide member in its first position;

sensing means for detecting the presence of film along the threading path subsequent to said drive sprocket wheel;

means responsive to the detection of film by said sensing means for moving said film guide member from its first to its second position; and means for moving said loop former from its first to its second position as said guide member is moved from its first to its second position, whereby the reach of film extending between the projection gate and said sprocket wheel will be shortened as the film closes upon said sprocket wheel, thereby effecting relative motion between the film and the sprocket wheel to insure proper alignment of the sprocket teeth and the film perforations.

* * * * *